March 17, 1959  W. F. ALLER  2,878,334
PRESSURE UNIT
Filed Oct. 28, 1955  3 Sheets-Sheet 1
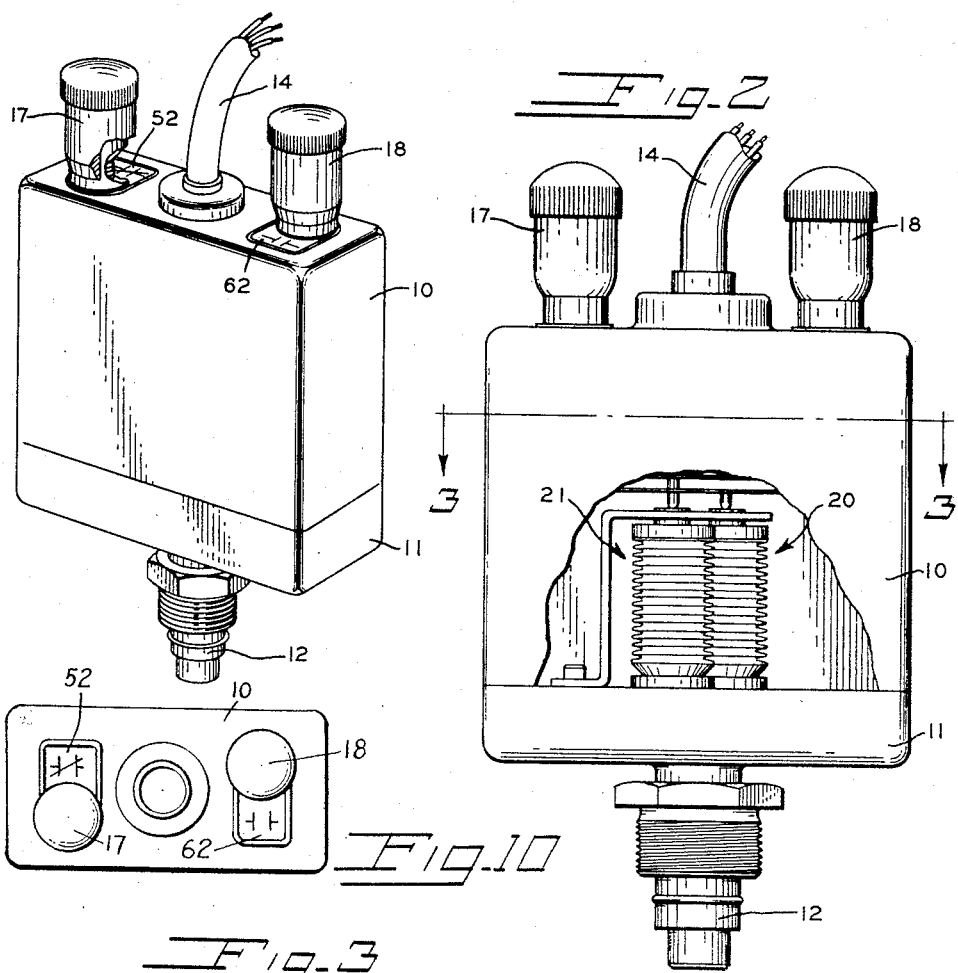
INVENTOR.
W. F. Aller
BY Edward T. Noe
atty

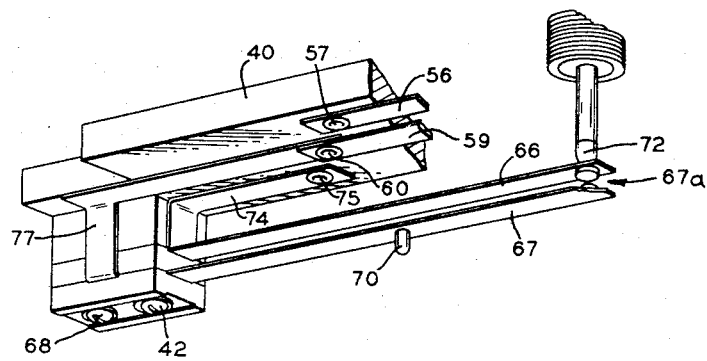
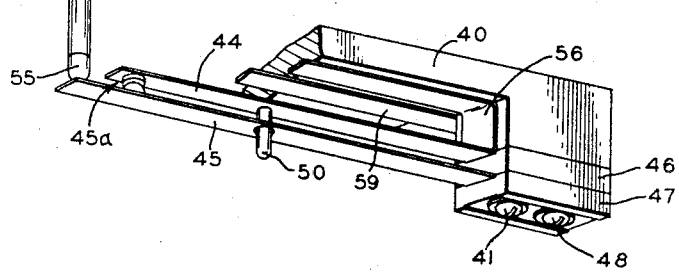
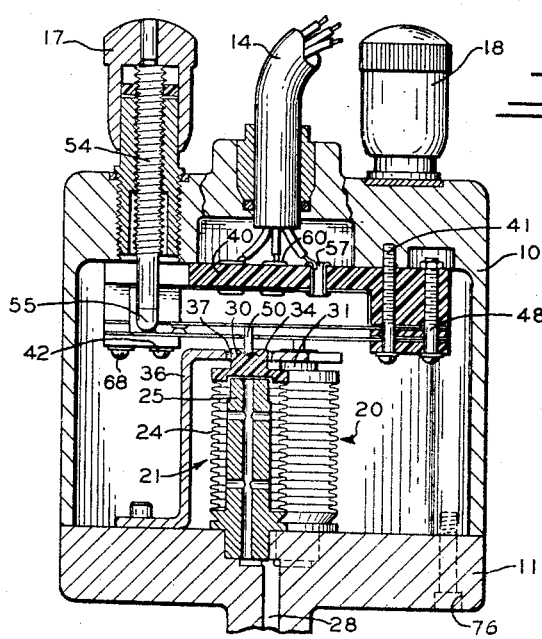

March 17, 1959

W. F. ALLER
PRESSURE UNIT 2,878,334

Filed Oct. 28, 1955

3 Sheets-Sheet 3

INVENTOR.
W. F. Aller
BY Edward J. Noigh
atty.

United States Patent Office 2,878,334
Patented Mar. 17, 1959

2,878,334

PRESSURE UNIT

Willis Fay Aller, Dayton, Ohio, assignor, by mesne assignments, to The Sheffield Corporation, a corporation of Delaware Application October 28, 1955, Serial No. 543,408

3 Claims. (Cl. 200—83)

This invention relates to switch operating pressure responsive devices.

It is an object of this invention to provide a switch operating pressure responsive unit for obtaining electric signals in response to fluid pressures, for example those in air gages, the unit being capable of extreme accuracy in response to particular pressures and also capable of operating with extreme rapidity.

It is a further object to provide such a unit which is extremely compact an simple in construction and easily assembled and disassembled as cooperating fluid pressure and electrical subassemblies.

It is a further object to provide a bellows and switch construction wherein the bellows is supported only at one end, the free end of the bellows and the switch means being operatively interconnected by engagement of a depression on one with a projection on the other.

It is a further object to provide a unit of the character referred to wherein a presure responsive bellows extends freely and unsupported from a first cooperating housing portion and a switch assembly mounted in a second housing portion is actuated in response to predetermined bellows deflections, the switch assembly and bellows being operatively connected by means of a centering depression at the free end of the bellows and an actuating projection extending from the switch means into the depression, whereby the bellows is supported in a friction-free manner against lateral movement and the unit is easily assembled and disassembled as cooperating fluid pressure and electrical sub-assemblies carried by the respective housing portions.

Figure 7:
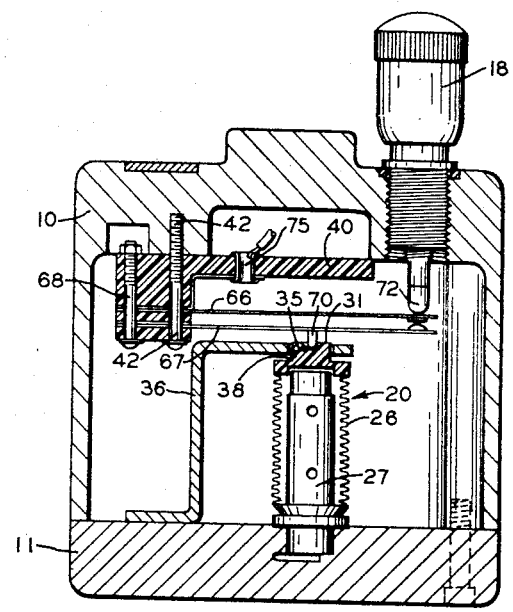
Figure 8:
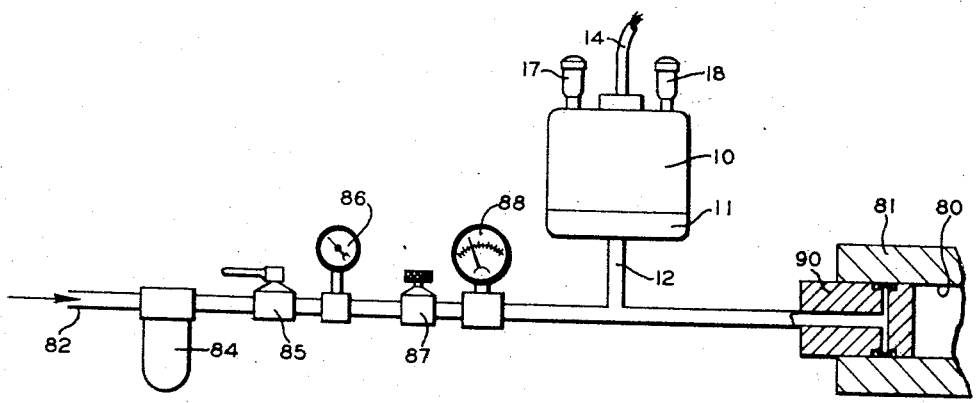
Figure 9:
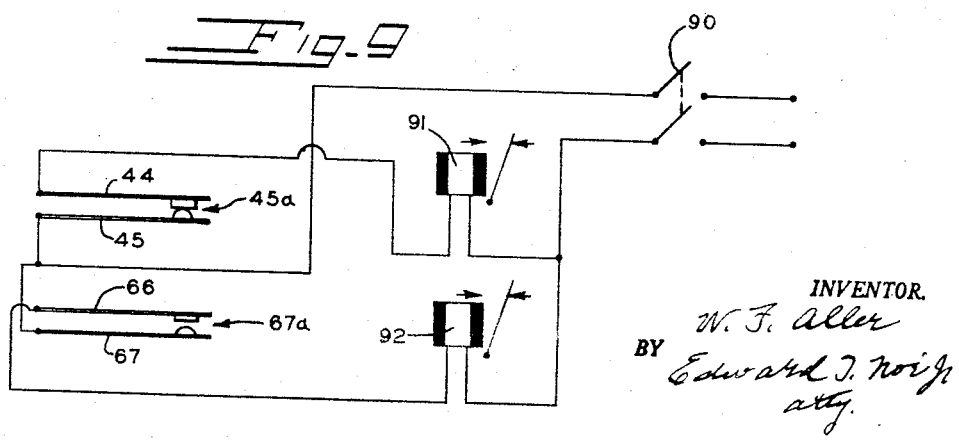

Other objects and advantages of the invention will be apparent from the following description, the appended claims and the accompanying drawing, in which, Figure 1 is a perspective view of a unit embodying the present invention, Figure 2 is a side view of the unit with the upper housing portion partially broken away, Figure 3 is a sectional view taken on line 3—3 of Figure 2, Figures 4 and 5 each illustrate one of the switch and bus bar assemblies in the exemplary unit, Figure 6 is a sectional view on line 6—6 of Figure 3, Figure 7 is a sectional view on line 7—7 of Figure 3, Figure 8 is an exemplary air circuit illustrating diagrammatically an application of the unit of the present invention as applied to obtain electrical signals in response to the diameter of a gaged article, Figure 9 is an exemplary electrical diagram, and Figure 10 is a view of the upper end of the unit.

The unit of the present invention is provided for opening or closing switch contacts in response to predetermined pressures within a fluid pressure system. Because of its compact size, its accurate and rapid response, and its freedom from error due to external influences such as vibration and the like, it is particularly adaptable for use in obtaining electrical signals in response to pressures obtained in an air leakage type gaging system for measuring product characteristics or movements. The exemplary unit illustrated for disclosing the features of this invention has been illustrated and will now be described as applied to such a system but it will be apparent that the unit will have application wherever extremely accurate, rapid, and reliable responses are necessary.

The unit is compactly constructed and comprises a pair of cooperating housing portions formed as an upper housing shell 10 and a base 11 having similar transverse outlines. A fluid pressure connection 12 is centrally arranged at one end of the base 11 and an electrical connection 14 leads centrally from shell 10 at the other end of the unit. Rotatable adjustment knobs 17 and 18 for adjusting the actuating points of the enclosed switch assemblies are rotatable about axes generally parallel to the aligned fluid pressure and electrical connections 12 and 14 and are disposed symmetrically at each side of connection 14 and adjacent thereto.

Bellows assemblies 20 and 21 are mounted on base 11 with the bellows arranged in overlapped relationship as seen in Figures 2 and 6 for compactness. Assembly 21 includes a bellows 24 which extends free and unsupported from a lower end fixed to bellows plug 25 sealably inserted into the base 11. Assembly 20, see Figure 7, similarly includes a bellows 26 surrounding a plug 27. Bellows assemblies 20 and 21 can be individually connected through base 11 to different pressures or, as shown, could be connected to the same pressure source through a common passage 28. Each of the plugs 25 and 27 have passages therein leading to the interior of the associated bellows and communicating with the central passage 28 adapted for communication through a connection 12 with the fluid leakage gaging system. Plugs 25 and 27 serve to substantially fill the respective bellows in order to decrease the interior volume thereof while allowing reflexing of the bellows and increasing the speed of response to changes in pressure.

Bellows caps 30 and 31 are sealably connected at the outer free ends of bellows 24 and 26 respectively. Centering notches or depressions 34 and 35 are formed at the outer ends of caps 30 and 31 respectively for cooperation with actuating projections in switch assemblies as will be later described. A stop bar 36 fixed to base 11 extends along the free ends of the bellows assemblies 20 and 21 and has openings 37 and 38 extending with clearance around the projecting portions of caps 30 and 31. This bar is normally clear of any contact with the bellows assemblies while being in position for engagement by the respective tube caps to limit extention of the bellows at predetermined maximum elongations.

Thus it is seen that a compact fluid pressure subassembly has been provided including base 11, bellows assemblies 20 and 21 and stop bar 36.

Housing shell 10 serves to support a pair of switch and bus bar assemblies for association with the pressure responsive bellows and includes the adjusting mechanism for determining the pressures at which the contacts of the assemblies will be actuated.

Figures 5 and 6 illustrate in detail the switch assembly associated with bellows assembly 21. A contact mounting block 40 is fastened to the inner surface of the upper end of shell 14 by means of screws 41 and 42. The switch assembly includes a pair of cooperating blades 44 and 45 carrying opposing electric contacts 45a adjacent their outer ends. The inner ends of blades 44 and 45 are fastened to block 40 through insulating insets 46 and 47 and are fixed to block 40 by screw 48 for removal therewith as an assembly. It will be seen that blades 44 and 45 extend in a cantilever manner from their support across and adjacent the free end of bellows assembly 21. An actuating projection 50 fixed to and extending from the central portion of blade 44 through a hole in blade 45 is urged into centering notch 34 by the resiliency of the blade which supports it. Bellows 24 is thus free for movement in a friction-free manner but is retained against lateral deflection by the interengagement and cooperation of projection 50 and notch 34. Contacts 46 of this assembly are normally closed and are opened at a predetermined extension of the associated bellows. A conventional electrical symbol indicating a closed switch is included on plate 52 associated with the adjusting knob 17 for this assembly. Through rotation of knob 17 screw 54 is rotated to adjust the position of screw cap 55 in engagement with blade 44 adjacent its outer end. By rotating knob 17, the switch assembly is adjusted so that contacts 45a are opened at a predetermined bellows extension and pressure as desired.

A bus bar 56 held in contact with the inner end of blade 44 leads to an eyelet 57 mounted in block 40. Similarly a bus bar 59 leads from blade 45 to center eyelet 60.

Referring particularly to Figure 7 it will be seen that the switch and bus bar assembly for bellows assembly 20 is one which is normally opened as indicated by the symbol on plate 62. Spring blades 66 and 67 forming part of this assembly and carrying opposed contacts 67a are mounted on and held in position relative to mounting block 40 by means of screw 68. Upon removal of screws 41 and 42 the entire switch assembly including the mounting block 40 and the switch blades is removable from shell 10 as a unit. Blade 67 has an actuating projection 70 extending from its central portion into resilient engagement with notch 35 at the upper end of bellows caps 31. Contacts 67a will be closed only following a predetermined extension of bellows 26 and to adjust the pressure at which this occurs knob 18 is rotated to position screw cap 72 in engagement with blade 66 adjacent its outer end.

Blade 66 engages bus bar 74 connected to eyelet 75 while blade 67 leads through bus bar 77 to center eyelet 60. As seen in Figure 4 leads from eyelets 57, 60, and 75 extend through connection 40.

Through the arrangement just described a second subassembly has been provided carried by housing shell 10 and including all the electrical components and adjustment means of the unit. These subassemblies are held in position when the housing portions 10 and 11 are fastened together by means of screws at diagonally opposite corners of the assembly, one of which is indicated at 76 in Figure 6. It will be noted that the only operative connection between the free end of the bellows and the switch assemblies is by means of the resilient engagement of actuating projections 50 and 70 with centering notches 34 and 35 respectively. Thus during assembly shell 10 is simply placed over base 11 and its supported bellows assemblies, bringing the projections and centering depressions or notches into operating engagement. These projections also serve to limit lateral swaying of the bellows without placing any friction drag on the bellows movement.

Figure 8 illustrates diagrammatically an air leakage gaging circuit for gaging the internal diameter of a hole 80 in a part 81. The system is conventional and, in series, includes a connection 82 leading from a source of air under controlled pressure, a filter 84, pressure regulator 85, pressure indicator 86, adjustable restrictor 87, and pressure responsive dimension indicator 88. Fluid leakage through openings provided in a gage head 90 will be restricted in accordance with the diameter of hole 80 and pressures occurring in the system between variable restrictor 87 and gage head 90 will be determined in accordance with this gaged dimension. Calibrated indicator 88 will indicate the dimension and the unit of this invention, being in communication with this portion of the system through connection 12 will be subjected to these pressures. Through adjustment of knobs 17 and 18 the pair of switch assemblies can be adjusted to respond at predetermined pressures in the gaging system and predetermined dimensions of the hole 80 being gaged. For example switch contacts 67a can be adjusted to close only at a predetermined pressure occurring when the diameter of hole 80 is at the minimum permissible dimension and remain closed when the size is below this dimension. Switch contacts 45a can be adjusted to be open at or above the diameter which is desired. Thus the switch contacts can be actuated at the extremes of the tolerance range and the dimension of a part gaged. The electrical signals provided thereby can be utilized for signal lights, segregating mechanism, machine control and the like.

In Figure 9 an exemplary relay electrical circuit has been illustrated supplied with power through a switch 90. Relay 91 is energized when contacts 45a are closed and relay 92 is energized when contacts 67a are closed. These relay actuations can be used in electrical circuits as expedient.

Thus it is seen that an extremely compact gaging unit has been provided for converting predetermined pressures to electrical signals. The unit, through the unique cooperation of its fluid pressure and electrical subassemblies, is assembled and disassembled in an extremely simple manner. All moving parts are extremely light in weight and limited in dimension adapting the unit for mounting on machines and in other situations where vibration will be prevalent without affecting the accuracy of the responses obtained.

It is to be understood that this invention is not limited to the precise form illustrated but that changes may be made therein without departing from the scope of the invention which is defined in the appended claims.

What is claimed is:

1. A unit for obtaining electric signals in response to pressures in a fluid system, comprising a unit housing formed by cooperating first and second housing portions each of said housing portions being integral and the two portions cooperating to form the entire housing and fully enclose the operating components of the unit, a pair of pressure responsive bellows mounted in parallel relationship at one end on one of said housing portions, said one housing portion including means providing a single supply passage for sealed connection to the system and a branch passage from said supply passage to the interior of each of said bellows, means at the outer end of each of said bellows providing an outwardly facing centering notch, a pair of switch assemblies, one for each bellows, each assembly comprising a pair of spring blades carrying cooperating switch contacts, means mounting said switch assemblies from the second of said housing portions with said blades extending in a cantilever manner in parallel side by side relationship and transversely across the free end of the associated bellows electrical conduit means connected to both said switch assemblies and leading through the wall of the respective housing portion, one blade of each assembly having an actuating projection maintained in resilient engagement with the centering notch of the respective bellows in the assembly, the bellows being otherwise unsupported, whereby the bellows is supported in a friction-free manner against lateral movement and the blades are actuated in response to bellows movements, said centering notches and actuating projections forming the sole operating connection between the bellows and switch assemblies which are automatically brought into operative relationship when the first and second housing portions are brought together, connection means between said housing portions for readily connecting and disconnecting said portions, and manually adjustable means accessible from the exterior of said housing for independently adjusting the position of the other blade of each pair to automatically obtain electric signals at two different predetermined pressures within said single supply passage.

2. A unit for obtaining electric signals in response to pressures in a fluid system, comprising a unit base adapted for mounting as desired, a pair of pressure responsive bellows supported at one end on said base and, said base including disconnectable means providing a single supply passage for sealed connection to the fluid system and branch passages from said supply passage to the interior of each of said bellows, stop means fixed to said base and extending into spaced opposing relationship with the free ends of the bellows for engagement therewith only upon predetermined maximum bellows expansions, a cup-shaped housing shell for engagement at its periphery with said base to complete the unit housing, a pair of switch assemblies, one for operative association with each of said bellows, each assembly including a pair of spring blades and electrical contacts carried thereby, means mounting one pair of said blades at one side of and within said housing shell, means mounting the other pair of said blades at the other side of said housing shell, the blade pairs extending in a cantilever manner from their respective mounts transverse the bellows axis and in adjacent parallel relationship across the free end of the associated bellows, an actuating projection fixed to one blade of each pair and extending toward the free end of the associated bellows, a centering depression at the free end of each bellows receiving the associated blade projection, each cooperating bellows and spring blade assembly maintaining the centering depression and respective projection in engagement, whereby each bellows is supported against lateral swaying in a friction-free manner and without associated guide structure, adjustment means threaded into the end of said housing shell at the unsupported end of each switch assembly, each including an inner projection in operative association with the other blade of the respective pair adjacent the outer end thereof, said adjustment means projecting beyond the housing and being rotatable about axes parallel to the axes of said bellows, and means detachably connecting said housing shell to said base whereby said unit is easily assembled and disassembled as cooperating fluid pressure and electric subassemblies, the only operating connection therebetween being through interengagement of the actuating projections and the corresponding receiving depressions which is automatically obtained upon assembly of the base and housing shell.

3. A unit for obtaining electric signals in response to pressures in a fluid system, comprising a base, a housing cooperating with said base to completely enclose the operating components of the unit, a pair of pressure responsive bellows each fixed at one end on said base and extending freely therefrom in closely adjacent parallel relationship, said base including a common supply passage for connection to the fluid system and branch passages leading from said supply passage to the interior of each of said bellows, a switch assembly for each of said bellows, each assembly including a pair of spring blades carrying opposed electrical contacts, means fixing each pair of blades at one end in said housing to extend transversely across the free end of the respective bellows when the base and housing are brought together in the completed assembly, adjustment means for each switch assembly threaded through said housing having knob means at their outer ends and positioning contacts at their inner ends in engagement with one blade of each assembly, actuating means between the other blade of each pair and the associated bellows including an actuating projection on one and a centering notch on the other automatically brought into operating engagement when the base and housing are assembled and resiliently maintained in operating engagement in the assembly, said projection and notch being the sole supporting and guiding structure for said bellows, and readily releasable connection means between said base and housing maintaining the components in assembled relationship.

References Cited in the file of this patent
UNITED STATES PATENTS

| | | |
|---|---|---|
| 1,475,697 | Hartman | Nov. 27, 1923 |
| 2,116,960 | Brown et al. | May 10, 1938 |
| 2,191,966 | Spangenberg | Feb. 28, 1940 |
| 2,401,213 | Wood | May 23, 1946 |
| 2,447,895 | Bauman | Aug. 24, 1948 |
| 2,448,653 | Aller | Sept. 7, 1948 |
| 2,454,423 | Baak | Nov. 23, 1948 |
| 2,476,927 | Stojanek | July 19, 1949 |
| 2,567,519 | Linvingston | Sept. 11, 1951 |
| 2,586,992 | Rapuano | Feb. 26, 1952 |
| 2,596,704 | Malutich | May 13, 1952 |
| 2,640,313 | Cobb | June 2, 1953 |
| 2,648,741 | Starbird | Aug. 11, 1953 |
| 2,698,633 | Harland | Jan. 4, 1955 |
| 2,722,580 | Hasselhorn et al. | Nov. 1, 1955 |
| 2,792,569 | Byrkett | May 14, 1957 |